US011263115B2

(12) United States Patent
Liu et al.

(10) Patent No.: US 11,263,115 B2
(45) Date of Patent: *Mar. 1, 2022

(54) PROBLEM DIAGNOSIS TECHNIQUE OF MEMORY CORRUPTION BASED ON REGULAR EXPRESSION GENERATED DURING APPLICATION COMPILING

(71) Applicant: INTERNATIONAL BUSINESS MACHINES CORPORATION, Armonk, NY (US)

(72) Inventors: Guan Jun Liu, Beijing (CN); Niao Qing Liu, Beijing (CN); Ai Lian Mi, Beijing (CN); Jing Jing Wen, Beijing (CN); Bei Chun Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 26 days.

This patent is subject to a terminal disclaimer.

(21) Appl. No.: 16/719,064

(22) Filed: Dec. 18, 2019

(65) Prior Publication Data
US 2020/0117572 A1 Apr. 16, 2020

Related U.S. Application Data

(63) Continuation of application No. 15/482,101, filed on Apr. 7, 2017, now Pat. No. 10,540,261.

(51) Int. Cl.
*G06F 9/44* (2018.01)
*G06F 11/36* (2006.01)

(52) U.S. Cl.
CPC ........ *G06F 11/366* (2013.01); *G06F 11/3624* (2013.01)

(58) Field of Classification Search
CPC ............................ G06F 11/366; G06F 11/3624
See application file for complete search history.

(56) References Cited

U.S. PATENT DOCUMENTS 4,819,237 A * 4/1989 Hamilton ............ G06F 11/0763
714/22
6,308,225 B1 * 10/2001 Schofield ................ G06F 9/548
719/316

(Continued)

FOREIGN PATENT DOCUMENTS

WO 2016153586 A1 9/2016

OTHER PUBLICATIONS

Cass, Stephen, "The 2016 Top Programming Languages C is No. 1, but big data is still the big winner", IEEE Spectrum, Posted Jul. 26, 2016, 2 pages, <http://spectrum.ieee.org/computing/software/the-2016-top-programming-languages>.

(Continued)

*Primary Examiner* — Adam Lee
(74) *Attorney, Agent, or Firm* — Robert D. Bean

(57) ABSTRACT

According to one embodiment, a method, computer system, and computer program product for memory corruption diagnosis is provided. The present invention may include generating a pattern expression (PE) header file, wherein a plurality of common datatypes associated with a software program are pre-defined. The invention may further include generating a PE for each of the plurality of common datatypes, and generating a PE table by merging the generated PEs for each of the plurality of common datatypes. Upon discovery that memory corruption has occurred, the invention may include transmitting a recorded state of the software program as a core dump file to a server, and using a dump utility to identify overlay content of the core dump file. Lastly, the invention may include identifying a possible source program of the memory corruption by matching the PE tables against the illegally-written overlay content.

12 Claims, 6 Drawing Sheets

(56) References Cited

U.S. PATENT DOCUMENTS

| | | | |
|---|---|---|---|
| 6,346,945 B1 | 2/2002 | Mansurov | |
| 6,535,999 B1* | 3/2003 | Merritt | G11C 29/028 |
| | | | 714/30 |
| 7,073,064 B1* | 7/2006 | Angelo | G06F 21/575 |
| | | | 710/10 |
| 7,127,642 B2 | 10/2006 | Wang | |
| 7,376,864 B1 | 5/2008 | Hu | |
| 7,467,267 B1* | 12/2008 | Mayock | G06F 11/1464 |
| | | | 711/162 |
| 7,913,115 B1 | 3/2011 | Powers | |
| 8,117,605 B2 | 2/2012 | Lev | |
| 8,839,206 B2 | 9/2014 | Kalra | |
| 8,966,312 B1 | 2/2015 | Gupta | |
| 9,116,947 B2* | 8/2015 | Fuller | G06F 16/245 |
| 9,223,679 B1 | 12/2015 | Ho | |
| 9,792,114 B1 | 10/2017 | Schaefer | |
| 10,346,286 B2 | 7/2019 | Liu | |
| 2001/0055227 A1* | 12/2001 | Takata | G11C 7/24 |
| | | | 365/199 |
| 2002/0075887 A1* | 6/2002 | Allwright | H04L 49/901 |
| | | | 370/428 |
| 2002/0154165 A1* | 10/2002 | Yu | G06F 9/451 |
| | | | 715/762 |
| 2004/0054989 A1 | 3/2004 | Harres | |
| 2004/0205399 A1 | 10/2004 | Wang | |
| 2006/0036874 A1 | 2/2006 | Cockerille | |
| 2007/0150509 A1 | 6/2007 | Lev | |
| 2008/0077586 A1* | 3/2008 | Lam | G06F 16/137 |
| 2008/0209294 A1* | 8/2008 | Brink | G11C 29/12 |
| | | | 714/735 |
| 2008/0270107 A1 | 10/2008 | George | |
| 2009/0031166 A1 | 1/2009 | Kathail | |
| 2009/0327994 A1 | 12/2009 | Christensen | |
| 2013/0080407 A1* | 3/2013 | Levow | G06F 16/2308 |
| | | | 707/692 |
| 2013/0268919 A1 | 10/2013 | Zagatta | |
| 2013/0304882 A1* | 11/2013 | Shepherd | H04L 29/06 |
| | | | 709/221 |
| 2013/0346797 A1* | 12/2013 | Lang | G06F 11/1402 |
| | | | 714/24 |
| 2014/0196013 A1* | 7/2014 | Orr | G06F 9/44526 |
| | | | 717/125 |
| 2015/0032988 A1 | 1/2015 | Muff | |
| 2015/0248564 A1 | 9/2015 | Feng | |
| 2015/0347129 A1 | 12/2015 | Chittimalli | |
| 2015/0365385 A1 | 12/2015 | Hore | |
| 2016/0313936 A1 | 10/2016 | Jones | |
| 2016/0335021 A1 | 11/2016 | Plonka | |
| 2017/0090885 A1* | 3/2017 | Cawley | G06F 8/37 |
| 2017/0177463 A1* | 6/2017 | Kleen | G06F 11/366 |
| 2017/0372094 A1 | 12/2017 | Hore | |
| 2018/0293148 A1 | 10/2018 | Liu | |
| 2018/0293149 A1 | 10/2018 | Liu | |
| 2018/0293150 A1* | 10/2018 | Liu | G06F 11/366 |

OTHER PUBLICATIONS

Cooprider et al., "Efficient Memory Safety for TinyOS", SenSys'07, Nov. 6-9, 2007, pp. 205-218.

IBM: List of IBM Patents or Patent Applications Treated as Related (Appendix P), Dec. 18, 2019, pp. 1-2.

Mell, et al., "The NIST Definition of Cloud Computing," National Institute of Standards and Technology, U.S. Department of Commerce, Special Publication 800-145, Sep. 2011, pp. 1-7.

Sezer et al., "MemSherlock: An Automated Debugger for Unknown Memory Corruption Vulnerabilities", CCS'07, Oct. 29-Nov. 2, 2007, pp. 562-572.

* cited by examiner

PROBLEM DIAGNOSIS TECHNIQUE OF MEMORY CORRUPTION BASED ON REGULAR EXPRESSION GENERATED DURING APPLICATION COMPILING

BACKGROUND

The present invention relates, generally, to the field of computing, and more particularly to the field of memory corruption diagnosis.

Memory, namely primary storage memory, allows computer processors to store instructions to be read and executed, and its integrity is essential to the operation of any modern computing technology. Memory may become corrupted when it is unintentionally modified as a result of programming errors, thereby breaking the continuity of the stored instructions. Memory corruption can occur when a program writes into an illegal or invalid memory block. Any program that subsequently attempts to read from the corrupted memory blocks will either crash or behave in a bizarre fashion.

SUMMARY

According to one embodiment, a method, computer system, and computer program product for memory corruption diagnosis is provided. The present invention may include generating a pattern expression (PE) header file, wherein the common datatypes associated with a software program are pre-defined, and modifying the software program to both include the PE header file and to add an annotation symbol to selected common datatypes of the software program. The invention may also include generating a PE for each of the common datatypes based on the modified software program, and generating a PE table by merging the generated PE for each of the common datatypes. Upon discovery that memory corruption has occurred, the invention may include transmitting a recorded state of the software program as a core dump file to a server, and using a dump utility to identify overlay content of the core dump file. The invention may further include converting the identified overlay content to a human-readable value. Lastly, the invention may include identifying a possible source program of the memory corruption by matching each PE stored in the generated table for each of the common datatypes against the illegally written data in the converted overlay content.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
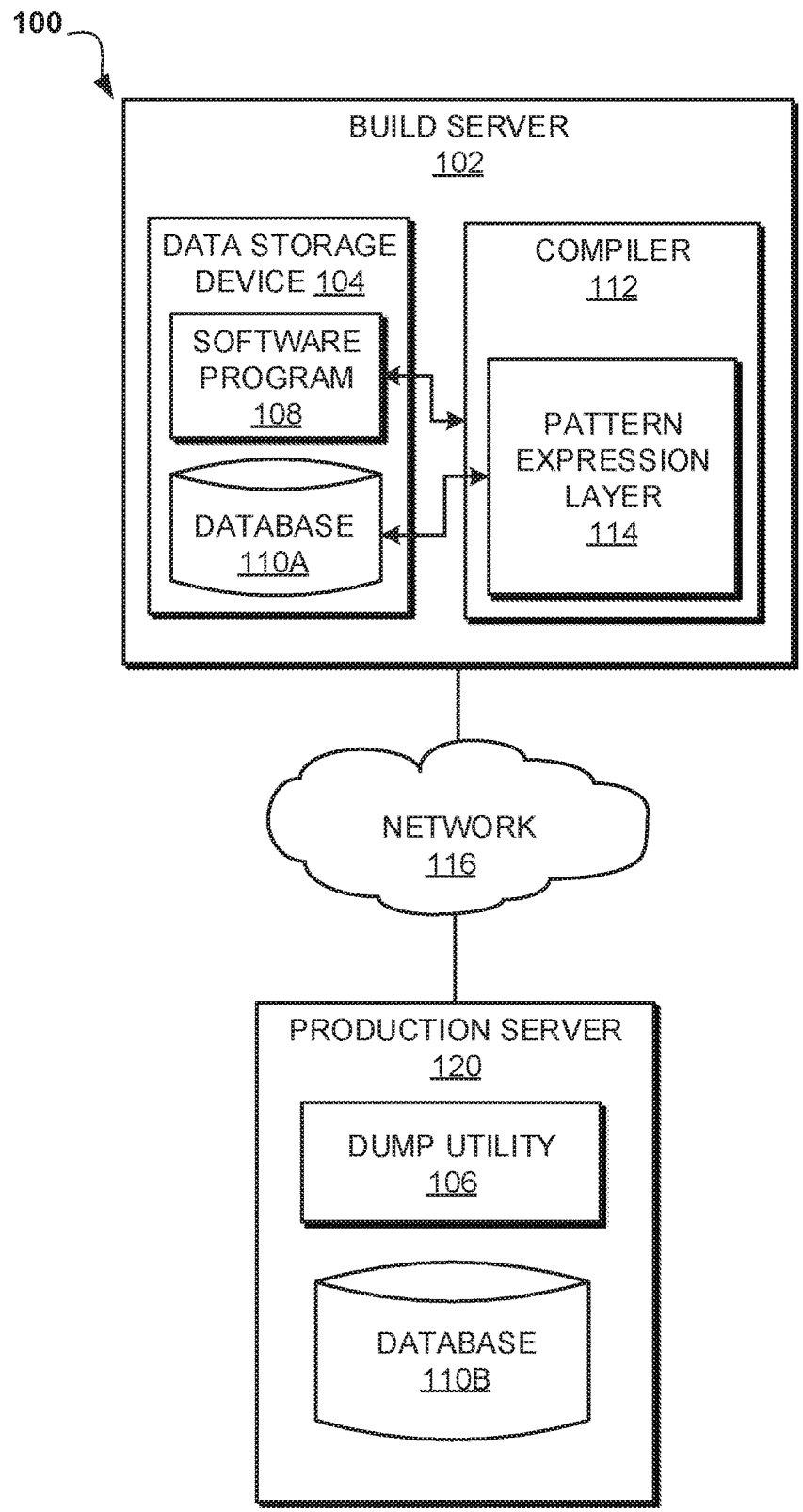
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate, generally, to the field of computing, and more particularly to the field of memory corruption diagnosis in computing devices. The following described exemplary embodiments provide a system, method, and program product to, among other things, identify the location of memory corruption and identify the program responsible by comparing crash data against data recorded when the program compiled. Therefore, the present embodiment has the capacity to improve the technical field of memory corruption diagnosis by introducing a method of memory diagnosis that may not impose any additional performance overhead, may analyze and diagnose the corruption autonomously instead of requiring the software programmer to identify overlay content manually, and may provide coverage of both the header and data sections of each memory block.

As previously described, memory allows computer processors to store instructions to be read and executed, and its integrity is essential to the operation of any modern computing technology. Memory may become corrupted when it is unintentionally modified as a result of programming errors, thereby breaking the continuity of the stored instructions. Memory corruption can occur when a program writes into an illegal or invalid memory block, and happens through a variety of mechanisms; for example, by programs overwriting beyond the bounds of the memory block allocated to them, writing to an uninitialized pointer, writing to a pointer that previously pointed to a memory block but has been deallocated, and other misuses of pointers. Once memory corruption occurs, data can be lost and program contents can be modified, resulting in further performance degradation, a system crash, or other unpredictable undesirable behavior. Memory corruption is notoriously difficult to diagnose since the corruption could be from any code, and the effect of the corruption does not manifest until well after the corruption occurred. Furthermore, effects appear under unusual conditions, making reproduction of the error difficult.

A variety of techniques exist in the art which attempt to address the memory corruption issue in different ways, and these fall into two general methods. The first method attempts to use debugger programs to actively monitor the system's memory for signs of memory corruption during runtime. Some debuggers go about this by attempting to detect memory corruption at the time when the memory is being released, or rely on periodic evaluation of the memory block. Another common debugging technique is to monitor specific memory locations and break the execution of the program when the memory is changed. This is also known as a "watchpoint" or "breakpoint" technique.

The second general method of memory corruption diagnosis is to wait until an error has occurred potentially as a result of memory corruption and examine the memory dump for evidence of memory corruption. If the offending code could be spotted by analyzing the dump that was produced when the error was detected, the need to run with a debugger is obviated. One of the more common methods of analyzing the dump is to locate the corrupted memory, and let the software programmer examine the overlay content and try to determine where the data may have originated.

However, all of these techniques come with significant drawbacks that impair their effectiveness at diagnosing memory corruption. The first general method calls for active monitoring of the system's memory, which imposes a performance overhead on the system. Furthermore, those methods that attempt to diagnose memory corruption at the time when the memory is being released suffer from the problem that the offending code could have been overwritten by the time of the scan. Those debug techniques that rely on periodic evaluation of the memory block frequently perform evaluations on header sections and omit data sections; as a result, corruption of data sections can be missed. Lastly, the "watchpoint" or "breakpoint" debug technique involves the monitoring of a specific memory location which may be legitimately used many times before becoming corrupted, since memory is often reused. As a result, the whole system may suffer particularly significant performance decline from the debug overhead; most users could not afford to run with this kind of debugger.

Regarding the second approach of evaluating error reports for diagnosing memory corruption, the current standard of tasking the software programmer with examining the data is flawed in that the process can be difficult, time consuming, and, even worse, inconclusive, since this approach relies heavily on the skill and knowledge of the application staff.

Thus, it is desirable to have a more effective and efficient way to identify the source of a memory corruption event. As such, it may be advantageous to, among other things, implement a system that does not impose any additional performance overhead, identifies the offending code before it is overwritten, analyzes and diagnoses the corruption autonomously instead of requiring the software programmer to identify overlay content manually, and provides coverage of both the header and data sections of each memory block.

According to one embodiment, the invention is a method that may equip the compiler with a new layer which may generate a pattern expression (PE) on each datatype of the software program when the software program is compiled. Next, the PEs that associate with each datatype of the software program may be stored in a library as tables. When memory corruption is identified, overlay content from the generated dump file may be matched against the PE tables to identify the possible source program of the corruption.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to compare an application's error reports against data gathered when the application was compiled in order to diagnose memory corruption.

Referring to FIG. 1, an exemplary networked computer environment 100 is depicted, according to at least one embodiment. The networked computer environment 100 may include build server 102 and production server 120 interconnected via a communication network 116. According to at least one implementation, the networked computer environment 100 may include a plurality of build servers 102 and production servers 120, of which only one of each is shown for illustrative brevity.

The communication network 116 may include various types of communication networks, such as a wide area network (WAN), local area network (LAN), a telecommunication network, a wireless network, a public switched network and/or a satellite network. The communication network 116 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Build server 102 may include a compiler 112 equipped with a pattern expression layer 114, a data storage device 104 that is enabled to host and compile a software program 108, and a database 110A, and communicate with the production server 120 via the communication network 116, in accordance with one embodiment of the invention. Build server 102 may be, for example, a mobile device, a telephone, a personal digital assistant, a netbook, a laptop computer, a tablet computer, a desktop computer, or any type of computing device capable of hosting and running a program and accessing a network. As will be discussed with reference to FIG. 4 the build server 102 may include internal components 402a and external components 404a, respectively. The build server 102 may also operate in a cloud computing service model, such as Software as a Service (SaaS), Platform as a Service (PaaS), or Infrastructure as a Service (IaaS). The build server 102 may also be located in a cloud computing deployment model, such as a private cloud, community cloud, public cloud, or hybrid cloud.

The production server 120 may be a laptop computer, netbook computer, personal computer (PC), a desktop computer, or any programmable electronic device or any network of programmable electronic devices capable of hosting and running a dump utility 106 and a database 110B and communicating with the build server 102 via the communication network 116, in accordance with embodiments of the invention. As will be discussed with reference to FIG. 4 the production server computer 120 may include internal components 402b and external components 404b, respectively. The production server 120 may also operate in a cloud computing service model, such as Software as a Service (SaaS), Platform as a Service (PaaS), or Infrastructure as a Service (IaaS). The production server 120 may also be located in a cloud computing deployment model, such as a private cloud, community cloud, public cloud, or hybrid cloud.

The compiler 112 is a known computer program capable of transforming source code written in a human-readable programming language, such as C++, Python® (Python® and all Python® based trademarks and logos are trademarks or registered trademarks of the Python Software Foundation and/or its affiliates), Java® (Java® and all Java® based trademarks and logos are trademarks or registered trademarks of Oracle Corporation and/or its affiliates), etc., into a computer-readable machine language to create a program that can be executed by the computer. According to the present embodiment, the pattern expression layer 114 may be an additional layer of the compiler 112 capable of converting the datatypes of software program 108 into tables of regular expressions, which are stored in a repository, such as database 110A, 110B.

According to the present embodiment, the dump utility 106 may be a computer program capable of evaluating the overlays of memory dumps performed upon detection of a fatal error, and comparing this data against the tables of regular expressions generated by Pattern Expression Layer 114 and stored in the database 110A, 110B to diagnose memory corruption. The memory corruption diagnostic method is explained in further detail below with respect to FIG. 2.

Figure 2:
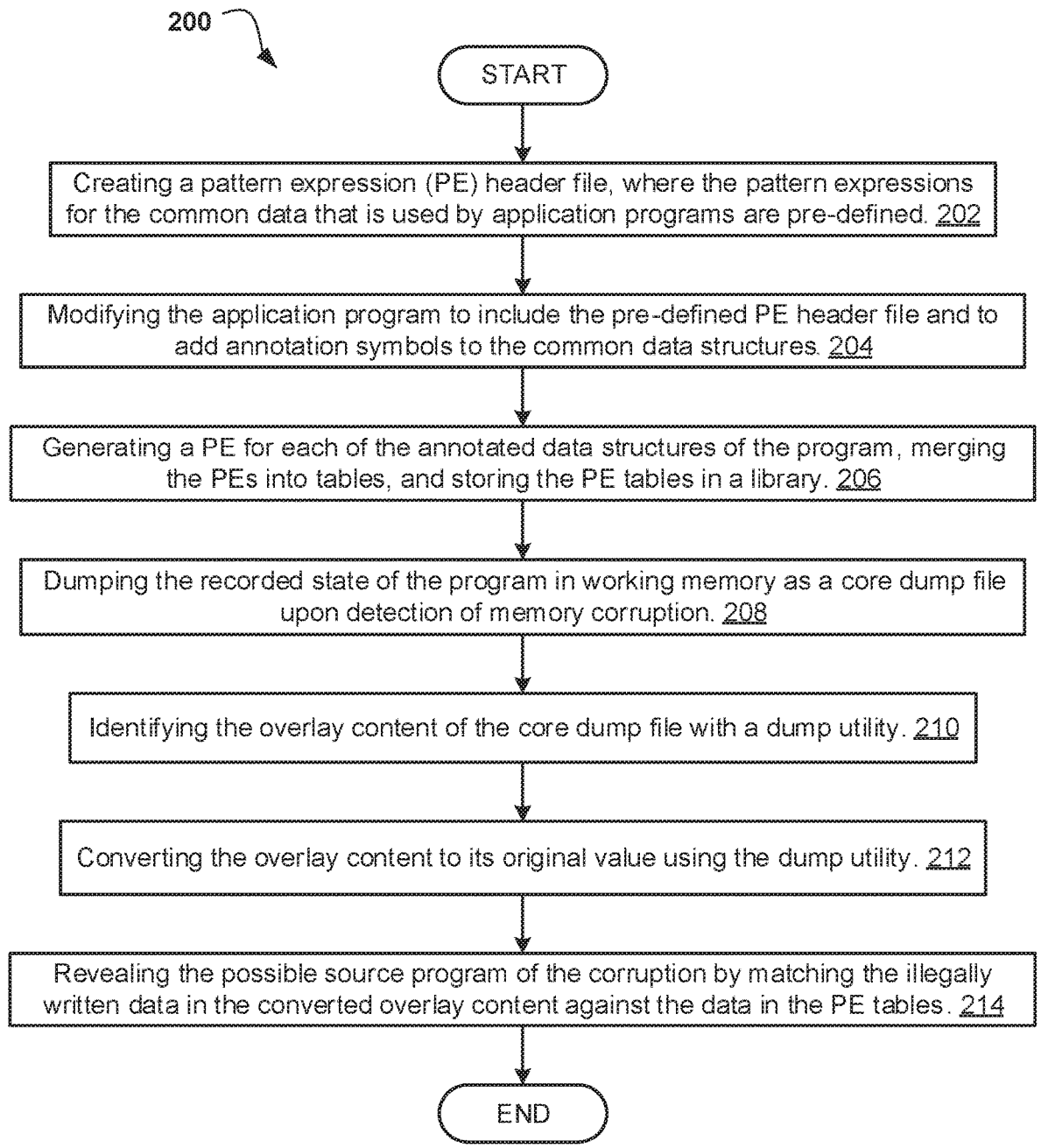
FIG. 2 is an operational flowchart illustrating a memory corruption detection process according to at least one embodiment.

Referring now to FIG. 2, an operational flowchart illustrating a memory corruption diagnostic process 200 is depicted according to at least one embodiment. At 202, the PE layer 114 creates a PE header file, within which the PE is pre-defined for each of the common datatypes that are used by software program 108. Pre-definition entails defining the mathematical process that will be employed to convert the common datatypes of software program 108 into PEs, and storing this process in the PE header file. As an example, common datatypes char and string may be pre-defined to use regular expressions to present their pattern; numerical datatypes like int, long, float, etc. may be pre-defined to either use the corresponding numerical value as the PE criteria, or use regular expressions and convert the numerical datatypes to the char type before comparing each with the regular expressions.

Then, at 204, the software program 108 is modified to incorporate the pre-defined PE header file, and to indicate which datatype in software program 108 will be converted to the pre-defined PEs. In one embodiment, the process may involve adding an annotation symbol (i.e. /@) to the datatype definition where the PE layer will use the pre-defined PEs. When compiling the software program, the compiler may parse these annotations according to the PE header file, and translate the source code into a PE table. An example of a software program, Library.h, incorporating the PE header file and with annotated datatypes may appear as follows:

---

Library.h
include<PE.h>
enum gender{male=1,female};
structure CustomerInfo{
char CardID[16]; /@CardID
gender gGender;
int iChannelID; /@ChannelID
char PhoneNum[12]; /@Phone
char address[32];
char mail[32]; /@Mail }

---

In this example, the PE header file, PE.h, is incorporated by reference into the software program via the line #include<PE.h>. Furthermore, the CardID, iChannelID, PhoneNum, and mail datatypes of the software program are selected to be included in the PE file, and are therefore annotated with the /@ symbol. The gender and address datatypes are not selected, and are therefore not appended.

Next, at 206, each annotated datatype of software program 108 may be converted by the compiler 112 into a PE, which may contain a link to the software program 108. These PEs may be merged together into PE tables, and stored in a library which may be accessible to the production server 120. The PE table for the sample pre-defined PE structure from the previous example may appear as follows:

PE Table for structure customerInfo:

| Offset | Annotation | Datatype | Data Length/Byte | PE |
|---|---|---|---|---|
| 0 | CardID | char | 16 | RE:6226\d{12} |
| 18 | ChannelID | int | 2 | Integer: [0, 3] |
| 20 | PhoneNum | char | 12 | RE: 1[3\|4\|5\|7\|8]\d{9} |
| 64 | mail | char | 32 | RE: \w*@\w*.\w* |

Then, at 208, when a fatal error occurs as a potential result of memory corruption, the recorded state of the software program 108 in working memory is then recorded in a core dump file which is stored in database 110B of production server 120. Fatal errors may occur when a program has reached a point where it can no longer continue running, and standard debugging practice may be to dump the entire state of the program at the time of the error into secondary memory to assist with debugging.

Next, at 210, the dump utility 106 identifies the overlay content of the core dump file. The overlay content may be known technology where a piece of storage is overwritten (or overlaid) by segments of other programs without the permission of the storage owner. For example, where program A owns a continuous 256 byte section of storage to store its information from address x'01000000' to x'01000100, and program B uses a wrong pointer (x'01000080') to write its own data into the storage owned by program A, the data written by program B may be considered 'overlay content.' One method of identifying overlay content may include the use of a front check zone and a back check zone to mark the owner of any given block of storage. The overlay content of the dump may appear as follows:

| +0 | 36323236 | 31323334 | 30303636 | 31323334 |
|---|---|---|---|---|
| +16 | 00010002 | 31333930 | 31303231 | 32333420 |
| +32 | 097F6E32 | 1E642F12 | 143A506C | 324F344A |
| +48 | 293E4A5F | 564E365D | 3E4E102D | 72314E6C |
| +64 | 6578616D | 706C6540 | 6578616D | 706C652E |
| +80 | 636F6D20 | 20202020 | 20202020 | 20202020 |

Here, the overlay content is written in hexadecimal and, as the example demonstrates, is unreadable by a human. Therefore, the hexadecimal overlay content must be converted back to a human-readable language for ease of troubleshooting and to facilitate matching against the PE tables.

Then, at 212, the dump utility 106 converts the overlay content of the core dump file to the original human-readable values through the use of the PE tables stored in the library, as well as the codepage of software program 108. As an example, the data presented in step 212 may be converted to the following table according to the customerInfo PE table illustrated in step 206:

| Offset | Length | Datatype | Translated Content | PE |
|---|---|---|---|---|
| 0 | 16 | char | 6226123400661234 | RE:6226\d{12} |
| 18 | 2 | int | 2 | Integer: [0, 3] |
| 20 | 12 | char | 13901021234 | RE: 1[3\|4\|5\|7\|8]\d{9} |
| 64 | 32 | char | example@example.com | RE: \w*@\w*.\w* |

Next, at 214, the dump utility 106 identifies the possible source program of the corruption, which may be software program 108, by matching the data illegally written into the corrupted memory against the data recorded in the PE tables. As an example, program A may use a wild pointer to write its data, consisting in this example of an email address, into storage belonging to program B, which may not have any variable or data related to email addresses. The 'criminal' program (i.e., program A) may be difficult to locate since there is no direct pointer to program A. However, dump utility 106 may locate the criminal program by searching the PE tables to identify which compiled programs the email address type data originated from.

Figure 3:
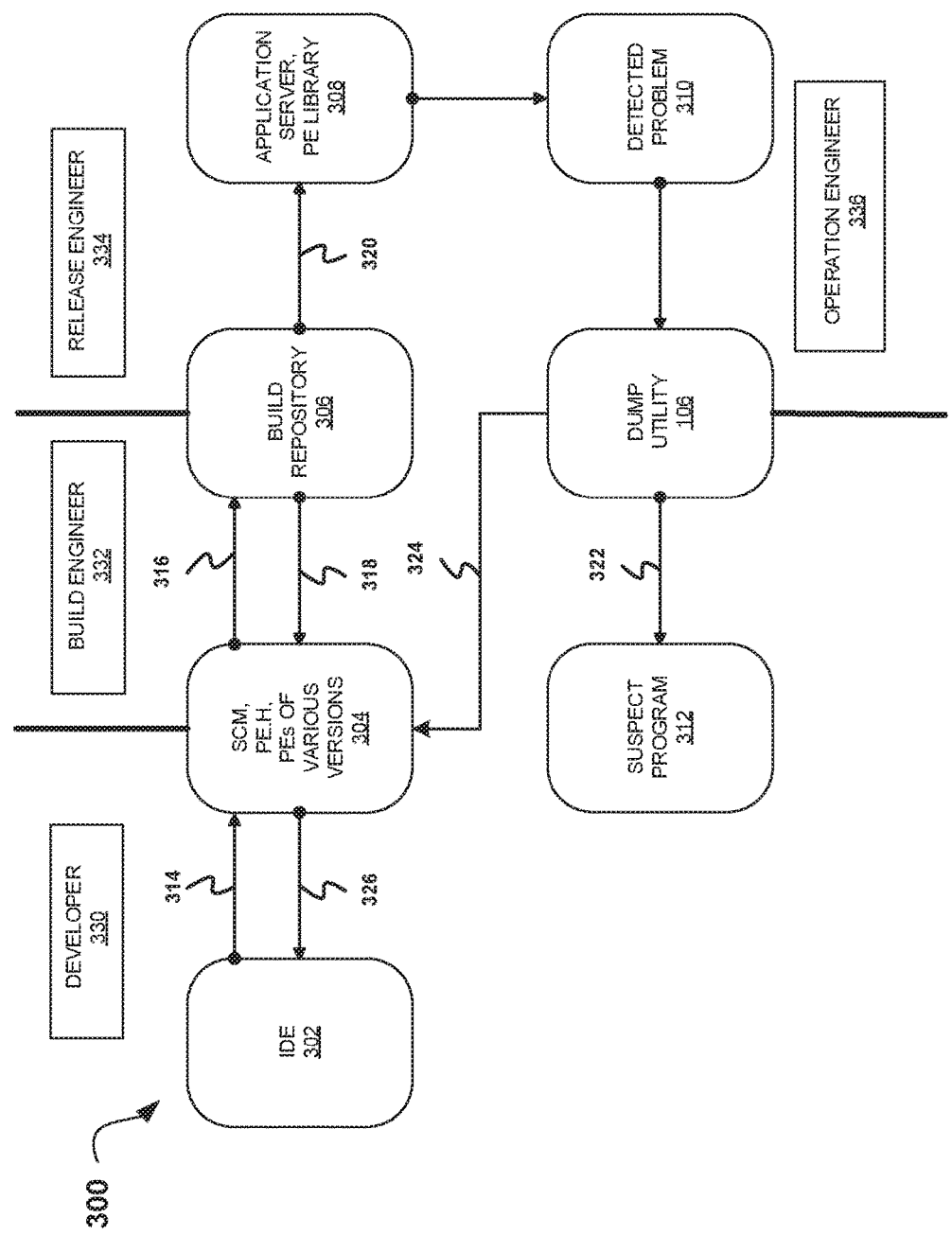
FIG. 3 is an operational flowchart illustrating the workflow of a memory corruption detection process in a software development and information technology operations (DevOps) environment according to at least one embodiment.

FIG. 3 is an operational flowchart illustrating the workflow in a software development and information technology operations (DevOps) environment. The developer 330 may be tasked with writing source code as well as the PE header file, PE.h, within the Integrated Development Environment (IDE) 302. Once the developer 330 completes and unit-tests the code, at 314, the developer 336 may commit the completed source code to the source control manager (SCM) 304. The SCM 304 is a software utility that manages changes to computer programs, tracking revisions and allowing access to earlier versions of the program. The build engineer 332 provides scripts to build the source code into real binary modules. At 316, the build engineer may place each build into a build repository 306. The build repository 306 is a storage location from which completed software packages (or 'builds') can be retrieved and installed on a computing device. At 318, the PE tables may be generated from PE.h when each build is placed into a build repository and stored in the SCM. At 320, the release engineer 334 may then retrieve the completed application and the PE tables from the build repository 306 and deploy them to the application server 308 for execution. At 322 when a detected problem 310 is experienced, the dump utility 106 may scan the overlay content to identify the suspect program 312 that associates with the PE. At 324, a notification may be sent to the SCM 304. At 326, the SCM 304 may then provide some functions to notify the developer 330 of the suspect program 312 so that the developer 330 can verify whether the identified memory corruption is a bug. The operation engineer 336 may maintain the systems, troubleshoot problems, and evaluate memory dumps. The operation engineer 336 may also oversee the detection of problems and the operation of the dump utility 106.

It may be appreciated that FIGS. 2 and 3 provide only an illustration of one implementation and do not imply any limitations with regard to how different embodiments may be implemented. Many modifications to the depicted environments may be made based on design and implementation requirements.

Figure 4:
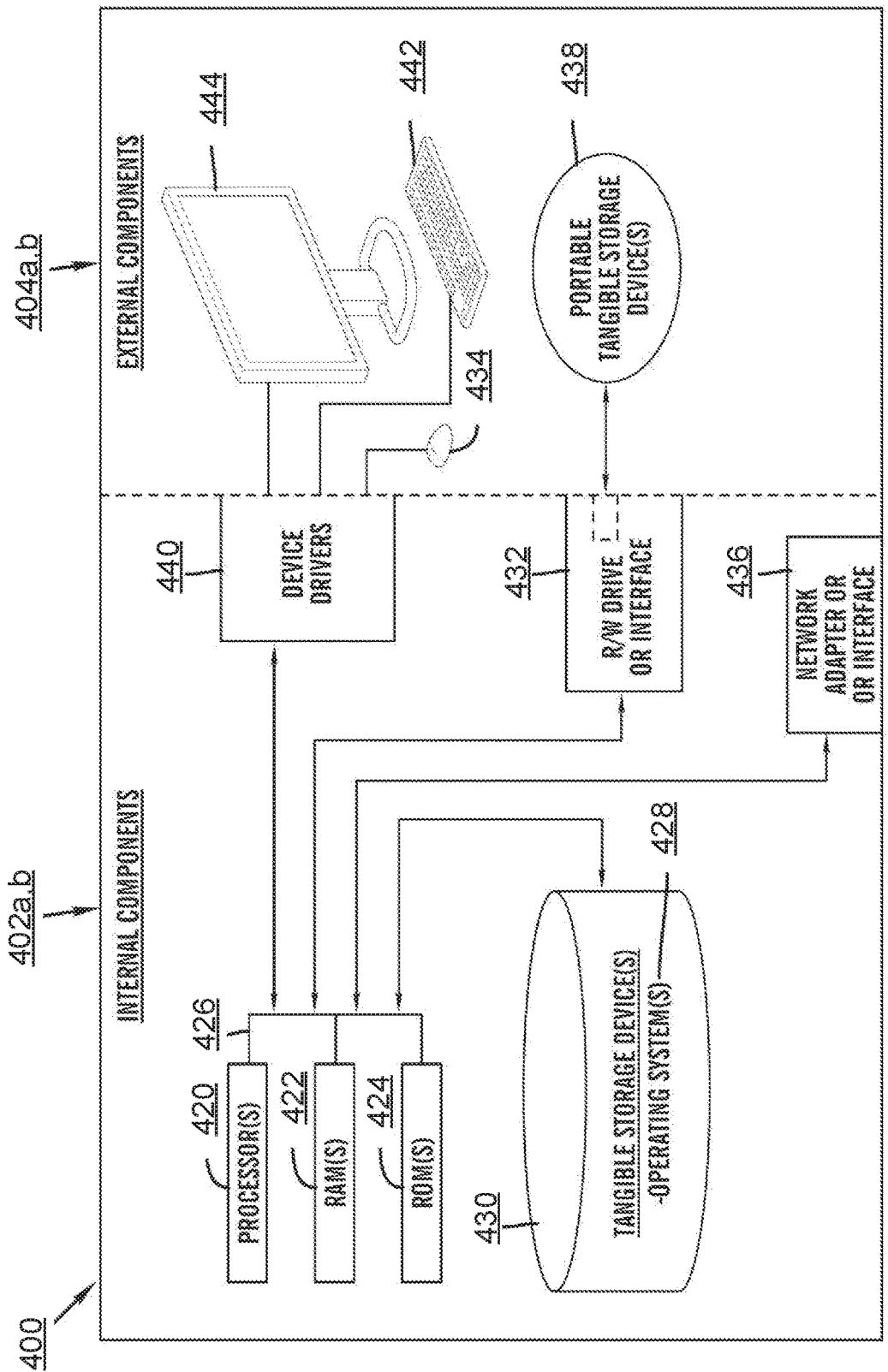
FIG. 4 is a block diagram of internal and external components of computers and servers depicted in FIG. 1 according to at least one embodiment.

FIG. 4 is a block diagram 400 of internal and external components of the build server 102 and the production server 120 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The build server 102 and the production server 120 may include respective sets of internal components 402a,b and external components 404a,b illustrated in FIG. 3. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the compiler 112 in the build server 102, and the dump utility 106 in the production server 120 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program 108 can be stored on one or more of the respective portable computer-readable tangible storage devices 438, read via the respective R/W drive or interface 432, and loaded into the respective hard drive 430.

Each set of internal components 402a,b also includes network adapters or interfaces 436 such as a TCP/IP adapter cards, wireless Wi-Fi interface cards, or 3G or 4G wireless interface cards or other wired or wireless communication links. The software program 108 in the build server 102 and the dump utility 106 in the production server 120 can be downloaded to the build server 102 and the production server 120 from an external computer via a network (for example, the Internet, a local area network or other, wide area network) and respective network adapters or interfaces 436. From the network adapters or interfaces 436, the software program 108 in the build server 102 and the dump utility 106 in the production server 120 are loaded into the respective hard drive 430. The network may comprise copper wires, optical fibers, wireless transmission, routers, firewalls, switches, gateway computers and/or edge servers.

Each of the sets of external components 404a,b can include a computer display monitor 444, a keyboard 442, and a computer mouse 434. External components 404a,b can also include touch screens, virtual keyboards, touch pads, pointing devices, and other human interface devices. Each of the sets of internal components 402a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
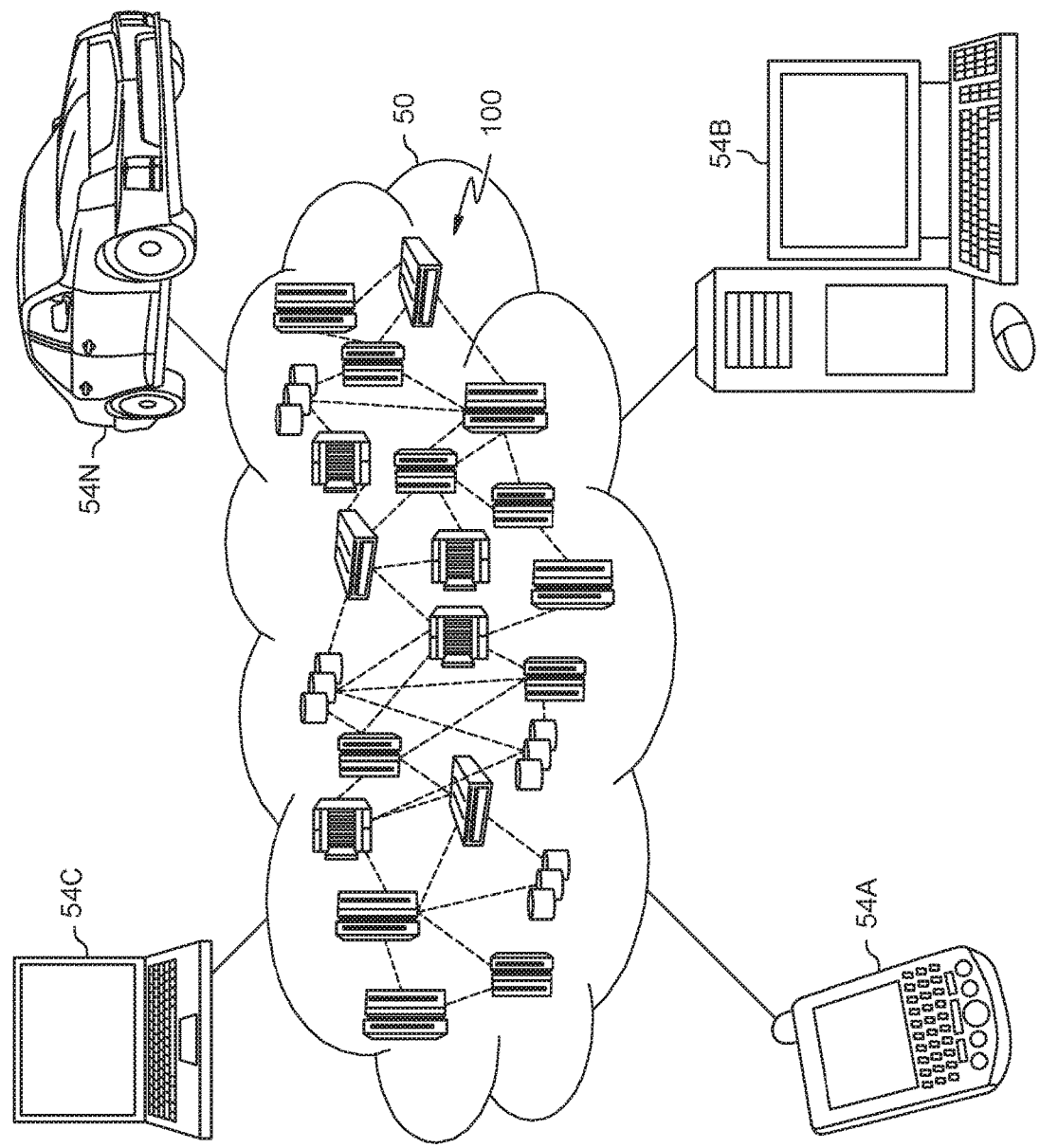
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
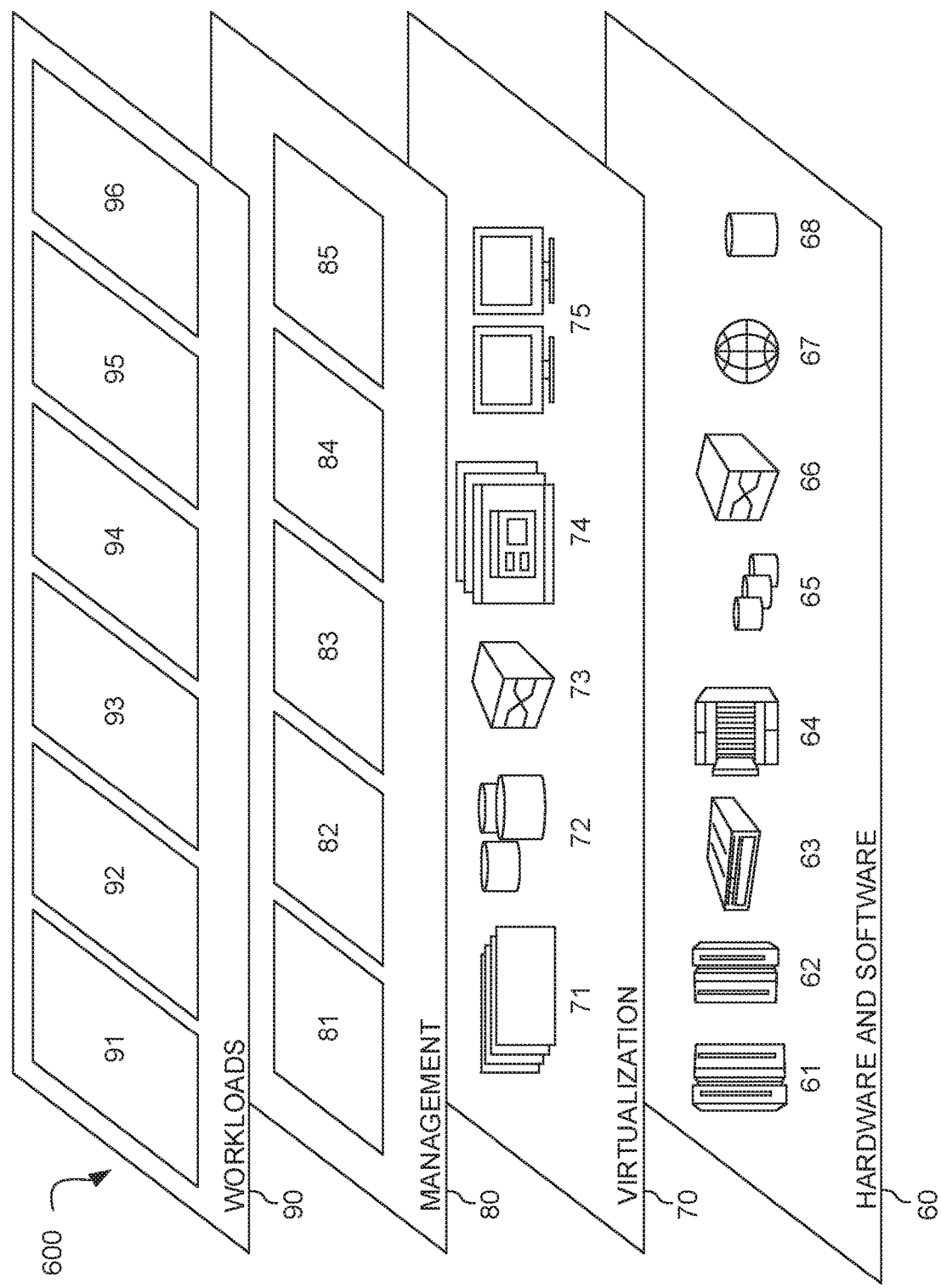
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and memory corruption diagnosis 96. Memory corruption diagnosis 96 may relate to evaluating the overlays of memory dumps performed upon detection of a fatal error, and comparing this data against the tables of regular expressions generated by pattern expression layer 114 and stored in database 110A, 110B to diagnose memory corruption.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for memory corruption diagnosis, the method comprising:
    generating a pattern expression (PE) header file;
    incorporating the PE header file into a plurality of programs;
    compiling the plurality of programs;
    converting, by a mathematical process, a plurality of datatypes associated with the plurality of compiled programs into PEs;
    storing the mathematical process in the PE header file; and
    responsive to one or more source programs writing into an illegal or invalid memory block, identifying one or more compiled programs of the plurality of compiled programs as the one or more source programs by matching one or more PEs stored in a generated table for each of the plurality of datatypes against one or more PEs identified within illegally written data in overlay content, wherein the overlay content is extracted from a recorded state of the plurality of compiled programs, and wherein the table is generated during the compiling by parsing annotations associated with the plurality of datatypes according to the PE header file.

2. The method of claim 1, wherein the one or more PEs are associated with a datatype, and comprise a link to the associated compiled program.

3. The method of claim 1, further comprising:
    converting the overlay content to a human-readable value.

4. The method of claim 1, further comprising:
    responsive to the one or more source programs writing into the illegal or invalid memory block, transmitting the recorded state of the plurality of compiled programs in a working memory storage as a core dump file to a server.

5. A computer system for memory corruption diagnosis, the computer system comprising:
    one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
    generating a pattern expression (PE) header file;
    incorporating the PE header file into a plurality of programs;
    compiling the plurality of programs;
    converting, by a mathematical process, a plurality of datatypes associated with the plurality of compiled programs into PEs;
    storing the mathematical process in the PE header file;
    responsive to one or more source programs writing into an illegal or invalid memory block, identifying one or more compiled programs of the plurality of compiled programs as the one or more source programs by matching one or more PEs stored in a generated table for each of the plurality of datatypes against one or more PEs identified within illegally written data in overlay content, wherein the overlay content is extracted from a recorded state of the plurality of compiled programs, and wherein the table is generated during the compiling by parsing annotations associated with the plurality of datatypes according to the PE header file.

6. The computer system of claim 5, wherein the one or more PEs are associated with a datatype, and comprise a link to the associated compiled program.

7. The computer system of claim 5, further comprising:
    converting the overlay content to a human-readable value.

8. The computer system of claim 5, further comprising:
    responsive to the one or more source programs writing into the illegal or invalid memory block, transmitting the recorded state of the plurality of compiled programs in a working memory storage as a core dump file to a server.

9. A computer program product for memory corruption diagnosis, the computer program product comprising:
    one or more computer-readable tangible storage media and program instructions stored on at least one of the one or more tangible storage media, the program instructions executable by a processor, the program instructions comprising:

generating a pattern expression (PE) header file;
incorporating the PE header file into a plurality of programs;
compiling the plurality of programs;
converting, by a mathematical process, a plurality of datatypes associated with the plurality of compiled programs into PEs;
storing the mathematical process in the PE header file;
responsive to one or more source programs writing into an illegal or invalid memory block, identifying one or more compiled programs of the plurality of compiled programs as the one or more source programs by matching one or more PEs stored in a generated table for each of the plurality of datatypes against one or more PEs identified within illegally written data in overlay content, wherein the overlay content is extracted from a recorded state of the plurality of compiled programs, and wherein the table is generated during the compiling by parsing annotations associated with the plurality of datatypes according to the PE header file.

10. The computer program product of claim 9, wherein the one or more PEs are associated with a datatype, and comprise a link to the associated compiled program.

11. The computer program product of claim 9, further comprising:
converting the overlay content to a human-readable value.

12. The computer program product of claim 9, further comprising:
responsive to the one or more source programs writing into the illegal or invalid memory block, transmitting the recorded state of the plurality of compiled programs in a working memory storage as a core dump file to a server.

* * * * *